UNITED STATES PATENT OFFICE.

ALEXANDER BERNSTEIN, OF BOSTON, MASSACHUSETTS.

FOOD PRODUCT AND PROCESS OF MAKING SAME.

SPECIFICATION forming part of Letters Patent No. 603,165, dated April 26, 1898.

Application filed December 13, 1897. Serial No. 661,720. (No specimens.)

*To all whom it may concern:*

Be it known that I, ALEXANDER BERNSTEIN, a subject of the Emperor of Germany, residing at Boston, in the county of Suffolk and State of Massachusetts, have invented certain new and useful Improvements in Dairy Products and Processes of Making the Same; and I do hereby declare the following to be a full, clear, and exact description of the invention, such as will enable others skilled in the art to which it appertains to make and use the same.

My present invention relates to the manipulation of milk for the purpose of producing a new dairy product.

My said invention is fully disclosed in the following description and claims.

In my former patent, No. 589,155, bearing date August 31, 1897, I have described a process of producing a cheese-curd from skimmed milk which has the softness of curd made from unskimmed milk. Prior to the granting of the patent just referred to I had taken out Patent No. 560,834, bearing date May 26, 1896, in which I described a process of making a beverage from the whey which is produced in the act of making cheese. These two patents set forth processes whereby nearly all of the constituents of skimmed milk are converted into desirable articles of use and commerce. As it is important that the beverage when placed upon the market shall be perfectly clear, in making it the albumen contained in the whey must be removed therefrom. My present invention has for its object the preservation and utilization of this ingredient, which would otherwise be a waste product.

While the separation of the albumen may be accomplished in carrying out either of the patented processes above referred to, its utilization is effected more directly in connection with the curd or cheese making process set forth in the Patent No. 589,155, to which reference has already been made. I will now proceed to describe the manner in which this is effected.

Commencing with the skimmed milk to produce the farinaceous curd, I first add to each liter of the same fifteen grams of the fine wheat-flour. I prefer the extremely fine varieties, especially that termed "pastry-flour." The milk is then coagulated as in the ordinary cheese-making processes and in the manner set forth in my said former patent, No. 589,155, to produce farinaceous curd. This curd after being cut and removed from the receptacle in which these operations are conducted is spread on a cloth, so that the remaining whey will easily filter or drain out of it. The whey that remains in the vat and that which drains from the curd is then boiled, preferably in a steam-kettle, when the albumen will be found in the whey in a coagulated condition. The albumen at this time, although coagulated, is very soft, and it is difficult to remove it by ordinary filtration, as it would soon clog the filtering material. I therefore draw the whey containing the coagulated albumen off into a receptacle of considerable depth in proportion to its diameter. Before doing this I place in the receptacle a linen bag of a size to form a loose lining for the same. The whey may be run into this receptacle while hot and allowed to remain therein for about ten minutes. The albumen will then collect in large masses of irregular form near the surface of the whey. As soon as the albumen has become coagulated the linen bag is slowly and gently lifted, allowing the liquid to run through. The bag is then suspended above the receptacle until the liquid, which is whey deprived of its albumen, has drained entirely therefrom. The albumen thus produced is then mixed with the uncooked farinaceous curd. In order that the mixture may be thoroughly homogeneous and be reduced to a condition in which it is most easily used in the processes of baking, I rub or grind the casein and albumen together until the mass assumes the appearance of a thick paste. I prefer to use in doing this a roller-mill used in the manufacture of chocolate, in which two heavy granite rollers are rolled around a center upon a granite surface; but other devices may be employed.

In the operation of reducing the curd and albumen to the form of paste I add about sixty grams of salt to every kilo of the mass to preserve it.

In using the product here described I take the amount of the same which I desire and thin it with milk, which can be easily done by reason of the finely-divided condition of albuminous curd. It can, if desired, be beaten in an egg-beater. The resulting mass will be in the form of an emulsion and can be added to the dough in the same way as eggs are now. I have used three parts of flour and one part of curd, and when baked the product has been found to be very palatable and nourishing.

The same amount of nourishment cannot be imparted to the dough by milk alone, as only a small amount of milk can be mixed therewith and permit it to retain the necessary consistency. The albumen of the improved albuminous curd corresponds to the white of an egg and the casein approaches in quality that of the yoke, while the finely-divided condition of the paste enables it to be used in much the same manner as eggs are now for baking purposes.

Instead of separating the casein and albumen from the milk in the manner described herein I may first boil the milk. By doing this the albumen becomes coagulated, although this is not apparent to the eye by reason of the opacity of the milk, and the coagulation does not form into masses or lumps, as in the boiled whey.

Boiled milk, as is well known, is not coagulated or curdled by rennet, but its susceptibility to the action of rennet can be restored by making it slightly acid. To do this, the boiled milk must be partially cooled. The lactic-acid germs are then added and the milk kept at a temperature most favorable to the growth of these germs. The acidity of the milk, when desired, may be produced by other acids.

If the boiled milk after cooling is charged with carbonic-acid gas by ordinary carbonating appliances rennet will again act on it; but the curd does not separate as well from the whey as when lactic acid is employed.

The milk may be acidulated before boiling instead of after, and for this purpose buttermilk, which is sour, may be mixed with the skimmed milk in the proportion in which they are obtained in the manufacture of butter—that is, one part of buttermilk to five parts of skimmed milk. The boiled milk having been brought into the proper condition is treated with rennet, farinaceous matter is added, and a curd produced which contains both the casein and albumem in very even mixture and which is of a very soft consistence. The curd is then reduced to a fine even paste, as before described.

In carrying out either of these processes acid may be used in lieu of rennet to coagulate the milk; but the resulting curd is not of such homogeneous and even texture.

When it is desired to preserve the product for considerable periods, the moisture of the paste is evaporated therefrom by heat or otherwise. The dried paste is then preferably reduced to a powder.

What I claim, and desire to secure by Letters Patent, is—

1. The process of obtaining a substitute for eggs from milk, which consists in coagulating both the casein and albumen of the milk, removing the liquid and then mechanically reducing the mixed curd to the consistency of paste, substantially as described.

2. As an article of manufacture, a substitute for eggs, consisting of coagulated milk, albumen and farinaceous curd intermingled and in a finely-divided condition, substantially as described.

3. As an article of manufacture, a substitute for eggs consisting of coagulated milk albumen and uncooked casein intermingled and in a finely-divided condition, substantially as described.

In testimony whereof I affix my signature in presence of two witnesses.

ALEXANDER BERNSTEIN.

Witnesses:
    JESSE W. SMITH,
    JOHN SCHRIBER.